(12) United States Patent
Jonasson et al.

(10) Patent No.: US 12,285,986 B2
(45) Date of Patent: Apr. 29, 2025

(54) METHOD FOR ESTIMATING TYRE NORMAL FORCE

(71) Applicant: VOLVO TRUCK CORPORATION, Gothenburg (SE)

(72) Inventors: Mats Jonasson, Partille (SE); Leo Laine, Härryda (SE); Bengt Jacobson, Mölnlycke (SE)

(73) Assignee: VOLVO TRUCK CORPORATION, Göteborg. (SE)

(*) Notice: Subject to any disclaimer, the term of this patent is extended or adjusted under 35 U.S.C. 154(b) by 338 days.

(21) Appl. No.: 17/754,878

(22) PCT Filed: Oct. 23, 2019

(86) PCT No.: PCT/EP2019/078823
§ 371 (c)(1),
(2) Date: Apr. 14, 2022

(87) PCT Pub. No.: WO2021/078371
PCT Pub. Date: Apr. 29, 2021

(65) Prior Publication Data
US 2023/0150332 A1 May 18, 2023

(51) Int. Cl.
*B60W 40/13* (2012.01)
*B60G 17/018* (2006.01)
(Continued)

(52) U.S. Cl.
CPC ..... *B60G 17/0182* (2013.01); *B60G 17/0195* (2013.01); *B60W 40/13* (2013.01);
(Continued)

(58) Field of Classification Search
CPC .......... B60G 2400/60; B60W 2530/20; B60W 40/13; B60W 2520/26; B60T 8/1725; B60T 2240/06; B60T 2240/03; B60C 23/0486
See application file for complete search history.

(56) References Cited

U.S. PATENT DOCUMENTS 6,424,907 B1 * 7/2002 Rieth ................ G01M 1/122
340/440
6,549,842 B1 4/2003 Hac et al.
(Continued)

FOREIGN PATENT DOCUMENTS

CN 104554244 A 4/2015
CN 109131344 A 1/2019
(Continued)

OTHER PUBLICATIONS

Japan Office Action dated Jul. 21, 2023 in corresponding Japan Patent Application No. 2022-523442, 6 pages.
(Continued)

*Primary Examiner* — Kenneth J Malkowski
(74) *Attorney, Agent, or Firm* — Venable LLP; Jeffri A. Kaminski

(57) ABSTRACT

A method for determining a tyre normal force range ($F_{z,min}$, $F_{z,max}$) of a tyre force ($F_z$) acting on a vehicle (100), the method comprising; obtaining (S1) suspension data (310) associated with a suspension system of the vehicle (100); obtaining (S2) inertial measurement unit, IMU, data (320) associated with the vehicle (100); estimating (S3), by a suspension-based estimator (330) a first tyre normal force range ($F_{z1,min}$, $F_{z1,max}$) based on the suspension data (310); estimating (S4), by an inertial force-based estimator (340), a second tyre normal force range ($F_{z2,min}$, $F_{z2,max}$) based on the IMU data (320); and determining (S5) the tyre normal
(Continued)

force range ($F_{z,min}$, $F_{z,max}$) based on the first tyre normal force range ($F_{z1,min}$, $F_{z2,max}$) and on the second tyre normal force range ($F_{z2,min}$, $F_{z2,max}$).

20 Claims, 5 Drawing Sheets

(51) Int. Cl.
    *B60G 17/0195* (2006.01)
    *G01G 19/08* (2006.01)
    *G01G 19/14* (2006.01)

(52) U.S. Cl.
    CPC ............. *G01G 19/08* (2013.01); *G01G 19/14* (2013.01); *B60G 2300/026* (2013.01); *B60G 2300/042* (2013.01); *B60G 2400/0511* (2013.01); *B60G 2400/0512* (2013.01); *B60G 2400/0531* (2013.01); *B60G 2400/0532* (2013.01); *B60G 2400/0533* (2013.01); *B60G 2400/104* (2013.01); *B60G 2400/106* (2013.01); *B60G 2400/204* (2013.01); *B60G 2400/60* (2013.01)

(56) References Cited

U.S. PATENT DOCUMENTS

| | | | | |
|---|---|---|---|---|
| 6,904,351 | B1* | 6/2005 | Hac | ......................... B60T 8/172 180/197 |
| 8,326,487 | B2 | 12/2012 | Moschuk et al. | |
| 2003/0065435 | A1* | 4/2003 | Krueger | ................... B60T 8/48 180/197 |
| 2004/0064219 | A1* | 4/2004 | Mancosu | ............ B60R 16/0237 73/146 |
| 2005/0012501 | A1* | 1/2005 | Isono | ...................... B60T 8/172 324/300 |
| 2009/0177346 | A1* | 7/2009 | Hac | ........................ B60W 40/13 701/31.4 |
| 2010/0131154 | A1 | 5/2010 | Moshchuk et al. | |
| 2014/0278040 | A1 | 9/2014 | Singh et al. | |
| 2018/0312063 | A1 | 11/2018 | Woopen et al. | |
| 2018/0361812 | A1 | 12/2018 | Chen et al. | |

FOREIGN PATENT DOCUMENTS

| | | |
|---|---|---|
| DE | 102016210373 A1 | 12/2016 |
| EP | 1147929 A1 | 10/2001 |
| EP | 3153375 A1 | 4/2017 |
| JP | 2007083743 A | 4/2007 |
| JP | 2011229286 A | 11/2011 |
| JP | 2013216278 A | 10/2013 |

OTHER PUBLICATIONS

Chinese Office Action dated Sep. 1, 2023 in corresponding Japan Patent Application No. 2019-80101490.5, 7 pages.

International Search Report and Written Opinion dated Aug. 10, 2020 in corresponding International PCT Application No. PCT/EP2019/078823, 11 pages.

Chinese Notice of Grant dated Nov. 23, 2023 in corresponding Chinese Patent Application No. 201980101490.5, 4 pages.

Japanese Office Action English Translation dated Jan. 19, 2024 in corresponding Japanese Patent Application No. 2022-523442, 2 pages.

\* cited by examiner

METHOD FOR ESTIMATING TYRE NORMAL FORCE

CROSS-REFERENCE TO RELATED APPLICATIONS

This application is a U.S. National Stage application of PCT/EP2019/078823, filed Oct. 23, 2019 and published on Apr. 29, 2021, as WO 2021/078371 A1, all of which is hereby incorporated by reference in its entirety.

TECHNICAL FIELD

The present disclosure relates to methods, control units, and vehicles for estimating normal forces acting on the tyres of a vehicle. The methods find applications in, e.g., level 4 (L4) autonomous driving.

The invention can be applied in heavy-duty vehicles, such as trucks and construction equipment. Although the invention will be described mainly with respect to cargo transport vehicles such as semi-trailer vehicles and trucks, the invention is not restricted to this particular type of vehicle but may also be used in other types of vehicles such as cars.

BACKGROUND

Advanced vehicle motion control systems are being introduced to support, e.g., autonomous drive functionality and to improve vehicle safety through advanced driver assistance systems (ADAS). These vehicle control systems use models that describe how the vehicle, or parts of the vehicle, is expected to behave in response to control signals for a given driving scenario.

An important parameter is the normal force acting on the tyres of the vehicle. The tyre normal force has a significant impact on, e.g., the acceleration capability of a vehicle, since it impacts road grip. Tyre normal force also has an impact on the achievable lateral force when controlling vehicle motion. It is therefore desired to estimate the tyre normal forces acting on a vehicle during vehicle operation.

US 2018/0361812 discusses systems and methods for real-time determination of tyre normal forces.

However, there is a need for more robust methods for determining normal forces acting on the wheels of a vehicle.

SUMMARY

It is an object of the present disclosure to provide improved methods for estimating tyre normal force. This object is obtained by a method for determining a tyre normal force range, $F_{z,min}$-$F_{z,max}$, of a tyre force $F_z$ acting on a vehicle. The method comprises obtaining suspension data associated with a suspension system of the vehicle and obtaining inertial measurement unit (IMU) data associated with the vehicle 100. The method comprises estimating, by a suspension-based estimator a first tyre normal force range, $F_{z1,min}$-$F_{z1,max}$, based on the suspension data 310 and estimating, by an inertial force-based estimator, a second tyre normal force range, $F_{z2,min}$-$F_{z2,max}$, based on the IMU data. The method then determines the tyre normal force range, $F_{z,min}$-$F_{z,max}$, based on the first tyre normal force range and on the second tyre normal force range.

This way a robust method for estimating tyre normal force is provided in that the estimation is based on two separate estimators operating on at least partially independent data sets. It is an advantage that a range of tyre normal force values are provided and not just a single value. By means of the disclosed method, robust estimates of tyre normal force can be provided to, e.g., a vehicle controller.

According to some aspects, the range comprises a single normal force value, i.e., $F_{z,min}$=$F_{z,max}$. In such cases the method determines the tyre normal force range, $F_{z,min}$-$F_{z,max}$, based on the first tyre normal force range and on the second tyre normal force range as a selection operation. The most reliably estimated normal force can then be selected.

According to some aspects, the suspension compression value is a bellow pressure value, an electromechanical suspension compression value or other compression force value associated with a suspension system of the vehicle.

Thus, the disclosed methods can be used with a variety of different types of suspension systems, which is an advantage.

According to other aspects, the first tyre normal force range ($F_{z1,min}$ to $F_{z1,max}$) is estimated based on a relationship $$F_z = F_{z,suspension} + \frac{m_{axle}}{2g} + c_{roll} * \varphi,$$

where $F_z$ is tyre normal force, $F_{z,suspension}$ is a compression force associated with the suspension system, $m_{axle}$ is a mass of a wheel axle, $c_{roll}$ is a roll stiffness value associated with the wheel axle, and $\varphi$ is a roll angle associated with the wheel axle.

This expression is of relatively low complexity, which is an advantage since the estimation can be performed despite limitations on processing resources. The expression is linear in its variables, and is therefore suitable for minimization and maximization operations, which is an advantage.

According to aspects, the first tyre normal force range ($F_{z1,min}$ to $F_{z1,min}$, $F_{z1,max}$) is determined based on a minimization and on a maximization, respectively, of an expression of tyre force based on the suspension data, subject to a set of pre-determined constraints on the suspension data. As will be shown in the following, these optimization operations can be performed in a straightforward manner. The result is a robust range which comprises the actual tyre normal force with high probability, which is an advantage.

According to other aspects, the first tyre normal force range ($F_{z1,min}$ to $F_{z1,max}$) is determined based on a nominal value of tyre force obtained based on the suspension data, and on a pre-determined perturbation of the suspension data.

By accounting for perturbation in input data, measurement error can be included in the model, which further improves on the robustness of the disclosed methods. The perturbation also provides a range of tyre normal force values where the actual tyre force resides with high probability.

According to aspects, estimating the second tyre normal force range comprises defining at least one virtual vehicle axle for each vehicle unit, estimating tyre normal forces for each virtual axle, and allocating the estimated tyre normal forces between the physical axles of the vehicle unit.

Thus, advantageously, tyre normal forces acting on multiple-axle vehicle units can be estimated with relatively low complexity. It is an advantage that tyre normal forces acting also on multi-axle vehicles can be efficiently and robustly estimated by the disclosed methods.

According to aspects, allocating the estimated tyre normal forces between the physical axles of the vehicle comprises allocating the estimated tyre normal forces based on a known load quotient between physical axles. This 'trick' simplifies calculations, which is an advantage.

According to aspects, the second tyre normal force range ($F_{z2,min}$ to $F_{z2,max}$) is also determined based on a minimization and on a maximization, respectively, of an expression of tyre force based on the IMU data, subject to a set of pre-determined constraints on the IMU data.

Again, these optimization operations can be performed in a straightforward manner. The result is a robustly estimated range which comprises the actual tyre normal force with high probability.

According to aspects, the second tyre normal force range ($F_{z2,min}$ to $F_{z2,max}$) is determined based on a nominal value of tyre force obtained based on the IMU data, and on a pre-determined perturbation of the IMU data.

Again, by accounting for perturbation in input data, measurement error can be included in the model, which further improves on the robustness of the disclosed methods.

The methods disclosed herein may also comprise determining an uncertainty value $F_{z,uncertainty}$ associated with the determined tyre normal force range ($F_{z,min}$ to $F_{z,max}$), wherein the uncertainty value is based on a measure of road roughness.

This way a vehicle controller receives information about the level of redundancy currently provided from the system, which is an advantage. Vehicle control can actively be based on the reliability of the provided tyre normal force estimates. For instance, speed margins and the like can be increased proactively if the reported uncertainty increases.

According to aspects, the measure of road roughness is obtained based on any of; an IMU vertical acceleration value, an IMU pitch-rate value, and on a variation in level sensors of the vehicle suspension system. Thus, the uncertainty measure is based on already available data, which is an advantage.

According to aspects, the disclosed methods also comprise determining a range of vehicle acceleration capabilities based on the determined tyre normal force range.

This means that a vehicle control algorithm can be provided with current acceleration capabilities of the vehicle, which is an advantage. The acceleration capabilities are robustly determined, since they are based on the determined range of tyre normal forces and not just on a single tyre normal force estimate.

According to aspects, the disclosed methods also comprise distributing wheel torque for vehicle operation between wheels of the vehicle, based on the determined tyre normal force range for each wheel. Thus, wheel torque can be distributed in dependence of current wheel normal force, thereby providing, e.g., increased vehicle robustness.

There is also disclosed herein control units, computer programs, computer readable media, computer program products, and vehicles associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
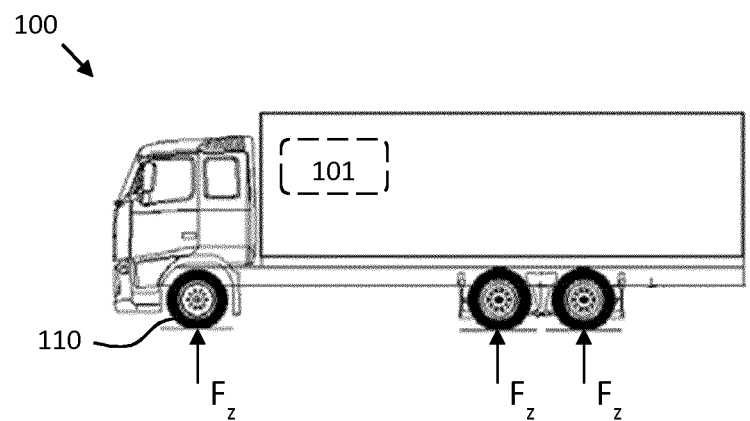
FIG. 1 schematically illustrates a vehicle for cargo transport.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIG. 1 illustrates a vehicle 100 for cargo transport. The vehicle is supported on wheels 110, some of which are powered or driven wheels. Each wheel is associated with a respective tyre normal force $F_z$. The tyre normal force (measured in Newton) is a vertical force which is sometimes also referred to as the load of the wheel or tyre. The vehicle 100 may comprise a control unit 101 arranged to estimate tyre normal force.

In the following, the x-axis is extending in the longitudinal (heading) direction of the vehicle 100, the y-axis is extending in the transversal direction of the vehicle, and the z-axis is extending in the vertical direction of the vehicle.

Figure 2:
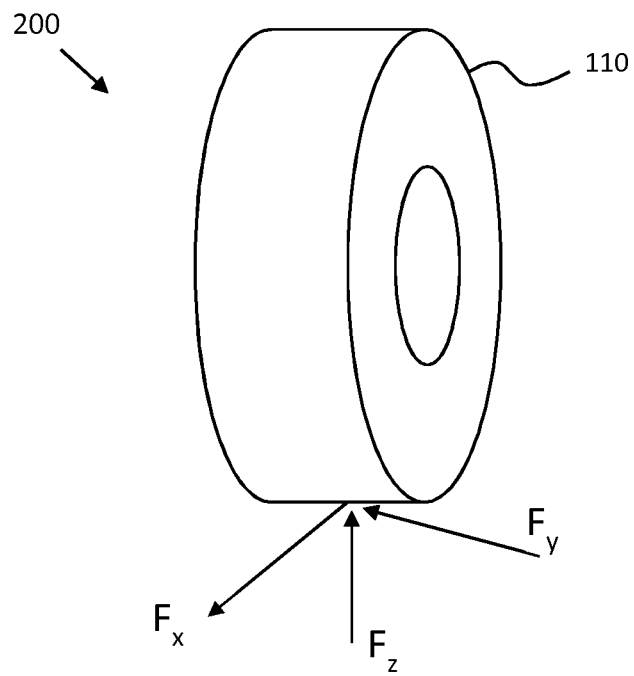
FIG. 2 illustrates some example forces acting on a vehicle tyre.

FIG. 2 schematically illustrates a vehicle tyre 200, such as a front wheel tyre or a rear wheel tyre. The tyre is subject to a longitudinal force $F_x$, a lateral force $F_y$, and a normal force $F_z$. The normal force $F_z$ is key to determining some important vehicle properties. For instance, the normal force to a large extent determines the achievable lateral tyre force $F_y$, since, normally, $F_y \leq \mu F_z$, where $\mu$ is a friction coefficient associated with a road friction condition.

Given information about current normal forces acting on a tyre 200, a range of vehicle acceleration capabilities between $a_{min}$ and $a_{max}$ can be determined. This information can be reported up to some vehicle control algorithm, such as a control algorithm for autonomous drive. The control algorithm can then better plan a vehicle trajectory, since it knows what accelerations that can be requested from the vehicle.

A vehicle 100 may also use the estimated tyre normal forces for distributing wheel torque for vehicle operation between wheels of the vehicle 100, based on the determined tyre normal force range for each wheel. A wheel associated with larger normal force may support more torque, while wheels associated with smaller normal force may not be able to support as large torques. This information may, e.g., be relevant to ensure vehicle stability.

Figure 3:
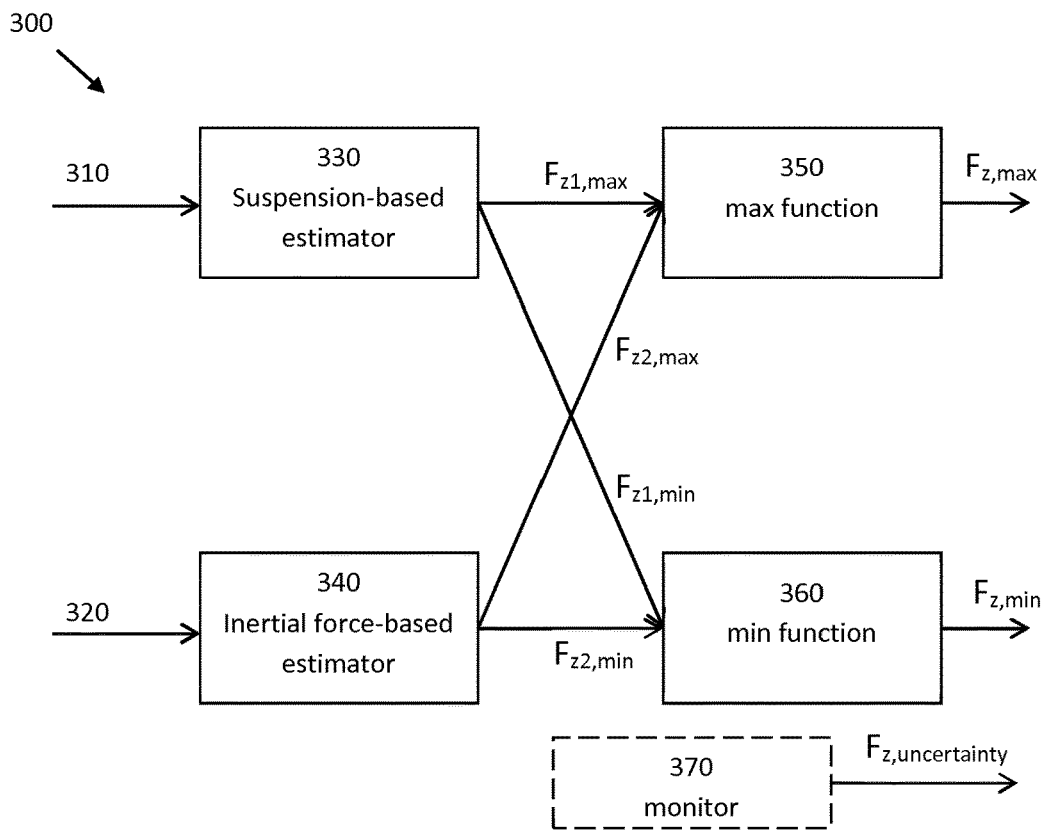
FIG. 3 is a block diagram illustrating normal force range estimation.

FIG. 3 schematically illustrates a system for robust estimation of tyre normal forces. The system is based on two different at least partially independent estimators;

A first estimator 330 uses data from the vehicle suspension system in order to estimate tyre normal force. This estimator obtains data 310 such as, e.g., bellow pressures or other compression force related value from the suspension system, and suspension position data (from levelling sensors) from the vehicle suspension system. Based on this data a range of normal forces is determined, delimited by an upper limit $F_{z1,max}$ and a lower limit $F_{z1,min}$.

A second estimator 340 uses data 320 from at least one Inertial Measurement Unit (IMU) to estimate tyre normal force. The IMU data may comprise, e.g., acceleration values about the x, y, and z-axis. This estimation again results in an upper limit $F_{z2,max}$ and a lower limit $F_{z2,min}$ on tyre normal force.

The ranges can, e.g., be determined from minimizing and maximizing, respectively, an expression for normal force based on the suspension data 310 and on the IMU data 320 under constraints on the input parameters.

The ranges can also be determined by first estimating a respective nominal value for the normal force, using the two different estimators, and then applying a perturbation to the suspension data 310 and the IMU data 320, respectively, to determine how the estimates vary. The variation below and above the nominal force value then gives the desired range of tyre normal forces.

The first and the second estimators are at least partly independent in the sense that they use different types of data for estimating normal force. Thus, the normal force estimation system in FIG. 3 comprises a measure of redundancy, which is an advantage. The output from the two estimators can be compared in order to verify the normal force estimates, which should be similar.

The outputs from the two estimators are merged into a final estimated tyre normal force range between a lower limit $F_{z,min}$ and an upper limit $F_{z,max}$.

A max function 350 determines the upper limit $F_{z,max}$ on the final estimated tyre normal force range. This max function may, e.g., comprise just selecting the largest value out of the first estimator upper limit $F_{z1,max}$ and the second estimator upper limit $F_{z2,max}$, or it may comprise a more advanced weighting function between the two, i.e., $F_{z,max}=w1*F_{z1,max}+w2*F_{z2,max}$, where w1 and w2 are weights summing to unity.

A corresponding min function 360 determines the lower limit $F_{z,min}$ on the final estimated tyre normal force range. This min function may also comprise just taking the smallest value out of $F_{z1,min}$ and $F_{z2,min}$, or it can comprise some weighting function like above.

The weights w1 and w2 may, e.g., be chosen in dependence of an accuracy level of the two estimators, where the more accurate estimator is assigned a larger weight compared to the less accurate estimator.

To summarize, there is disclosed herein a system for estimating tyre normal force which uses two separate normal force estimators 330, 340 where upper and lower limits on tyre normal force are calculated for each of the estimators. The system is redundant in the sense that tyre normal force is estimated based on at least two different principles, i.e., based on suspension data 310 and based on IMU data 320. The system is, according to some aspects, arranged to perform a method for determining a tyre normal force range $F_{z,min}$, $F_{z,max}$ of a tyre force $F_z$ acting on the vehicle 100. The method comprises obtaining suspension data 310 associated with a suspension system of the vehicle 100, and obtaining IMU data 320 associated with the vehicle 100. The method comprises estimating, by a suspension-based estimator 330 a first tyre normal force range $F_{z1,min}$, $F_{z1,max}$ based on the suspension data 310, and estimating, by an inertial force-based estimator 340, a second tyre normal force range $F_{z2,min}$, $F_{z2,max}$ based on the IMU data 320. The method then determines the tyre normal force range $F_{z,min}$, $F_{z,max}$ based on the first tyre normal force range $F_{z1,min}$, $F_{z1,max}$ and on the second tyre normal force range $F_{z2,min}$, $F_{z2,max}$.

It is appreciated that the inertial based estimator 340 may not be perfectly reliable when operating the vehicle 100 on uneven ground, since the IMU data is then negatively affected in terms of accuracy by the vehicle as it travels over rough surfaces. In such scenarios accurate normal force estimates comes mainly from the suspension based estimator 330. In this situation, the performance is degraded since there is a reduced redundancy in that one estimator is no longer reliable. To cope with these types of situations, a monitor 370 may be added to detect that the vehicle is driven over uneven ground. The monitor outputs a measure of uncertainty $F_{z,uncertainty}$ associated with the range $F_{z,min}$ to $F_{z,max}$. If the vehicle is driven on an uneven road, then the measure of uncertainty will be high and the end-user of the normal force estimate could take action by, e.g. lowering vehicle speed.

According to some aspects, the suspension-based estimator 330 and the inertial force-based estimator 340 determines respective single values of normal force. In this case the determined normal force range becomes a single value, i.e., $F_{z,min}=F_{z,max}$. The determining may then comprise selecting the most reliable of the normal force estimates from the suspension-based estimator 330 and the inertial force-based estimator 340.

The suspension-based estimator 330 and the inertial force-based estimator 340 will now be discussed in more detail.

Figure 4:
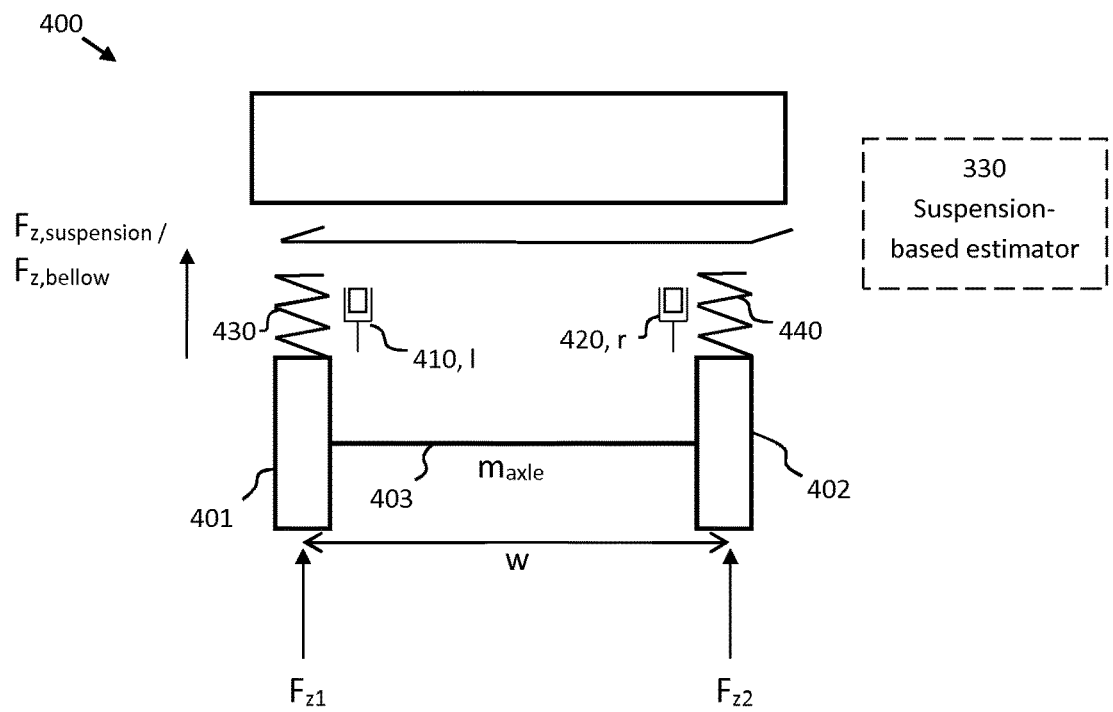
FIG. 4 schematically illustrates a suspension-based normal force estimator.

FIG. 4 schematically illustrates a vehicle wheel axle with a suspension system 430, 440. The suspension system comprises level sensors 410, 420 and resilient members 430, 440, e.g., bellows or springs, configured to output a reading indicating compression which can be converted into a compression force value $F_{z,suspension}$. The compression value may, e.g., be a bellow pressure value $F_{z,bellow}$, an electromechanical suspension compression value or other compression force value associated with a suspension system of the vehicle 100.

The two wheels 401, 402 are connected by an axle 403 with weight $m_{axle}$.

For the model in FIG. 4, tyre normal force range ($F_{z1,min}$, $F_{z1,max}$) can be estimated based on a relationship $$F_z = F_{z,suspension} + \frac{m_{axle}}{2g} + c_{roll} * \varphi,$$

where $F_z$ is tyre normal force, $F_{z,suspension}$ is a compression force associated with the suspension system such as a pressure value from suspension bellows, $m_{axle}$ is a mass of the wheel axle, $c_{roll}$ is a roll stiffness value associated with the wheel axle, and $\varphi$ is a roll angle associated with the wheel axle (not shown in FIG. 4). Note that forces over the actual suspension members have been neglected for simplicity in the above relationship. The roll angle $\varphi$ may, e.g., be given from level sensors as $$\varphi = \frac{l-r}{w},$$

where l is the left level sensor output, r is the right level sensor output, and w is track width of the vehicle.

According to some aspects, the first tyre normal force range $F_{z1,min}$ to $F_{z1,max}$ is determined based on a minimization and on a maximization operation, respectively, of the above expression for tyre force $F_z$ based on the suspension data 310, subject to a set of pre-determined constraints on the suspension data 310.

Since the expression for tyre force $F_z$ based on the suspension data 310 is a linear combination of input variables, a method involving differentiation can be employed to obtain the first tyre normal force range. The parameters may first be lumped to a fewer amount of parameters in order to simplify calculation. The expression is then differentiated to obtain a minimum and a maximum value.

The expression for normal force based on the suspension data 310 can be reformulated as $F_z = f(k,u)$ where $$k = \left[\frac{m_{axle}}{2g}, c_{roll}, w\right],$$

and where $u = [F_{z,suspension}, l, r]$.

The expression for tyre force $F_z$ based on the suspension data 310 then becomes $$F_z = u_1 * k_1 + \frac{k_2}{k_3}u_2 - \frac{k_2}{k_3}u_3,$$

where $\alpha_i$ denotes element i in vector a.

$F_{z1,min}$ can be found by solving the optimization problem;

$$\min_{k,u} u_1 * k_1 + \frac{k_2}{k_3}u_2 - \frac{k_2}{k_3}u_3$$

subject to a set of pre-determined constraints on the parameter vectors k and u. These constraints can, for instance, be set as some statistical deviation from a measured nominal value, and/or manually configured. Similarly, $F_{z1,max}$ can be found by solving;

$$\max_{k,u} u_1 * k_1 + \frac{k_2}{k_3}u_2 - \frac{k_2}{k_3}u_3$$

subject to the set of pre-determined constraints on the parameter vectors k and u.

Methods for minimizing and maximizing these types of linear expressions are known and will not be discussed in more detail herein.

Repeatedly solving an optimization problem in real-time on-board the vehicle 100 may however not always be practical or even computationally feasible. The example above is not very complex, but the inertial based estimator which will be discussed in detail below is more complex with the risk to be stuck at a local minima, i.e., global minima and maxima values may not be found.

As an alternative or a complement, an approach that will simplify the computation and find global minimum and maximum with high probability will now be presented. The above expression for normal force is again re-formulated;

$$F_z = f(k, u) = q + p^T u$$

$$q = \frac{m_{axle}}{2g}$$

$$p = \left[1, \frac{c_{roll}}{w}, \frac{c_{roll}}{w}\right]$$

$$u = [F_{z,suspension}, l, r]$$

consider now perturbed parameters: $p_i = p_{i,0} \pm \Delta p_i$, where $p_{i,0}$ is a nominal value of the parameter and $\pm \Delta p_i$ is the expected deviation i.e we have bounded the parameter to be inside $[p_{i,0} - \Delta p_i, p_{i,0} + \Delta p_i]$. We do the same for the inputs $u_i = u_{i,0} \pm \Delta u_i$. Now;

$$F_z = q + p^T u = q + \sum_{i=1}^{n}(p_{i,0} \pm \Delta p_i)(u_{i,0} \pm \Delta u_i) \approx$$
$$q + \sum_{i=1}^{n}(p_{i,0}u_{i,0} \pm \Delta u_i p_{i,0} \pm \Delta p_i u_{i,0}) == F_{z,nom} + \sum_{i=1}^{n}(\pm \Delta u_i p_{i,0} \pm \Delta p_i u_{i,0})$$

Finding a minima can be done by selection the sequence of + and − above that minimizes the expression. If $p_{i,0}$ and $u_{i,0}$ both are positive the smallest value is given by $$F_{z,nom} + \sum_{i=1}^{n}(-\Delta u_i p_{i,0} - \Delta p_i u_{i,0}).$$

Thus, according to the example above, the first tyre normal force range $F_{z1,min}$ to $F_{z1,max}$ is determined based on a nominal value of tyre force $F_z$ obtained based on the suspension data 310, and on a pre-determined perturbation of the suspension data 310.

The second estimator 340 in FIG. 3 uses data 320 from at least one IMU to estimate tyre normal force $F_z$. The inertial force based estimator 340 is based om measurements comprising acceleration about axes x, y, and z, and angular speeds (also around axes x, y, z). The model does not necessarily include direct measurements from the suspension system, but the model does include suspension parameters such as roll stiffness.

Figure 8:
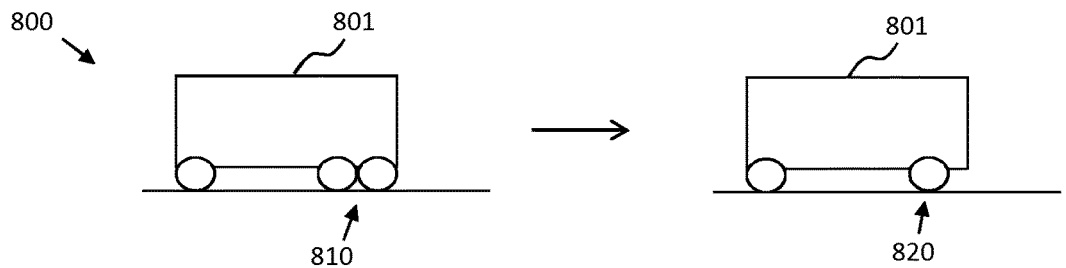
FIGS. 8-9 show vehicle units with physical axles mapped to virtual axles.
Figure 9:
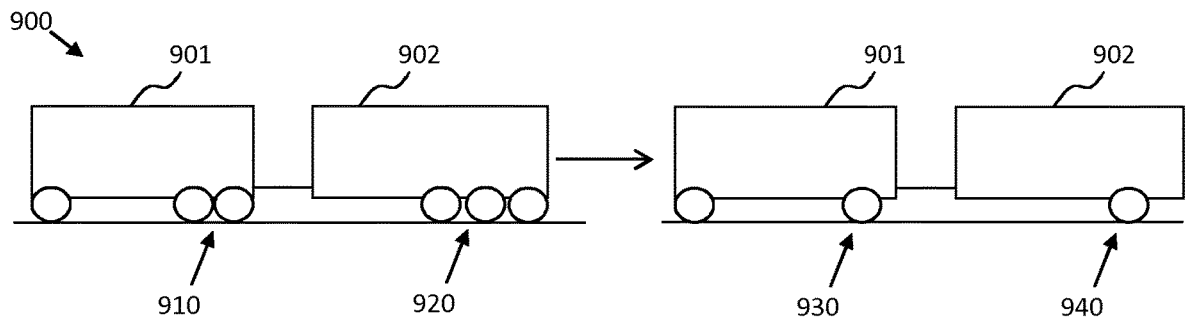

Since a vehicle model with many axles (>2) often is associated with prohibitive complexity and an associated risk to end up with a reduced model validity, a strategy to reduce the complexity of the model is proposed. This strategy is based on definition of virtual axles. FIGS. 8 and 9 schematically illustrate the definition of virtual axles; FIG. 8 shows an example 800 with a single vehicle unit 801 supported on three axles and FIG. 9 illustrates an example 900 where two vehicle units 901, 902 are supported on a total of six axles. For example, if a vehicle unit 801 has two rear axles 810, they are grouped together and represented by a single virtual axle 820. A similar situation is illustrated for the vehicle unit 901 in FIG. 9 which also has two rear axles 910. A towed vehicle unit 902 with three physical axles 920 grouped together will be modelled as a vehicle unit 902 with a single virtual axle 940 representing the three physical axles 910, as shown in FIG. 9.

If a vehicle unit center of gravity (CoG) is available, then a vertical plane through the CoG may be used to assign physical axles to front or rear vertical axles. The location of the at least one virtual axle 820, 930, 940 can be selected such as to be pitch torque equivalent with the corresponding vehicle unit 801, 901, 902.

An axle roll stiffness for front and rear axles $C_f$, $C_r$, respectively, of the at least one virtual axle may be determined by adding physical roll stiffness of corresponding physical axles.

A roll center height $H_{rc}$ of the at least one virtual axle may be defined as an average roll center height of the corresponding physical axles.

Normal forces are then estimated for the wheels on one or more of the virtual axles.

Figure 5:
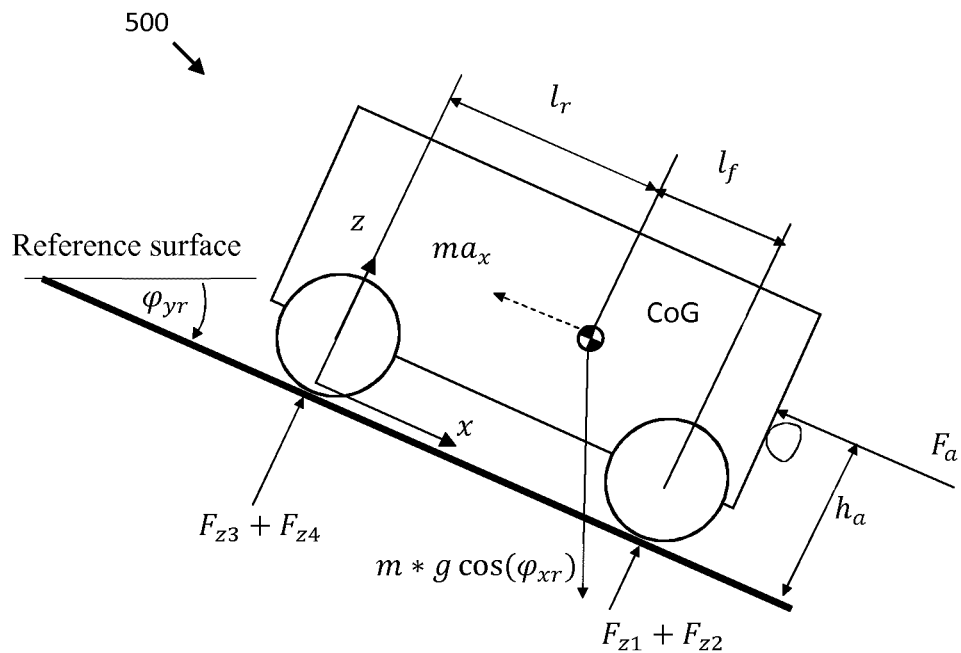
FIGS. 5-7 illustrate an example vehicle model for normal force estimation.
Figure 6:
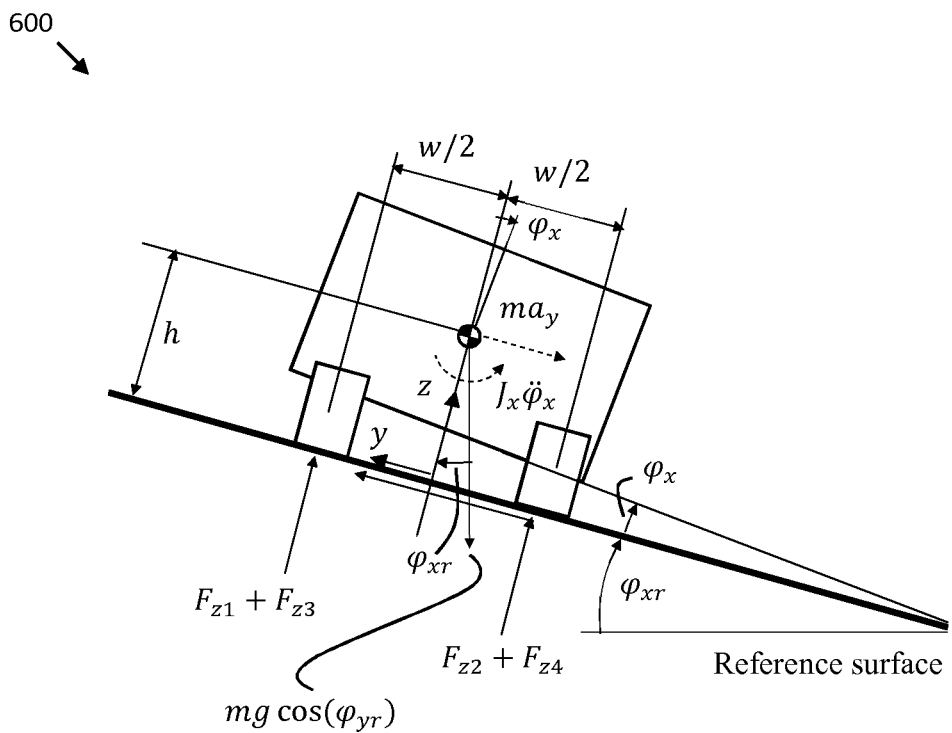
Figure 7:
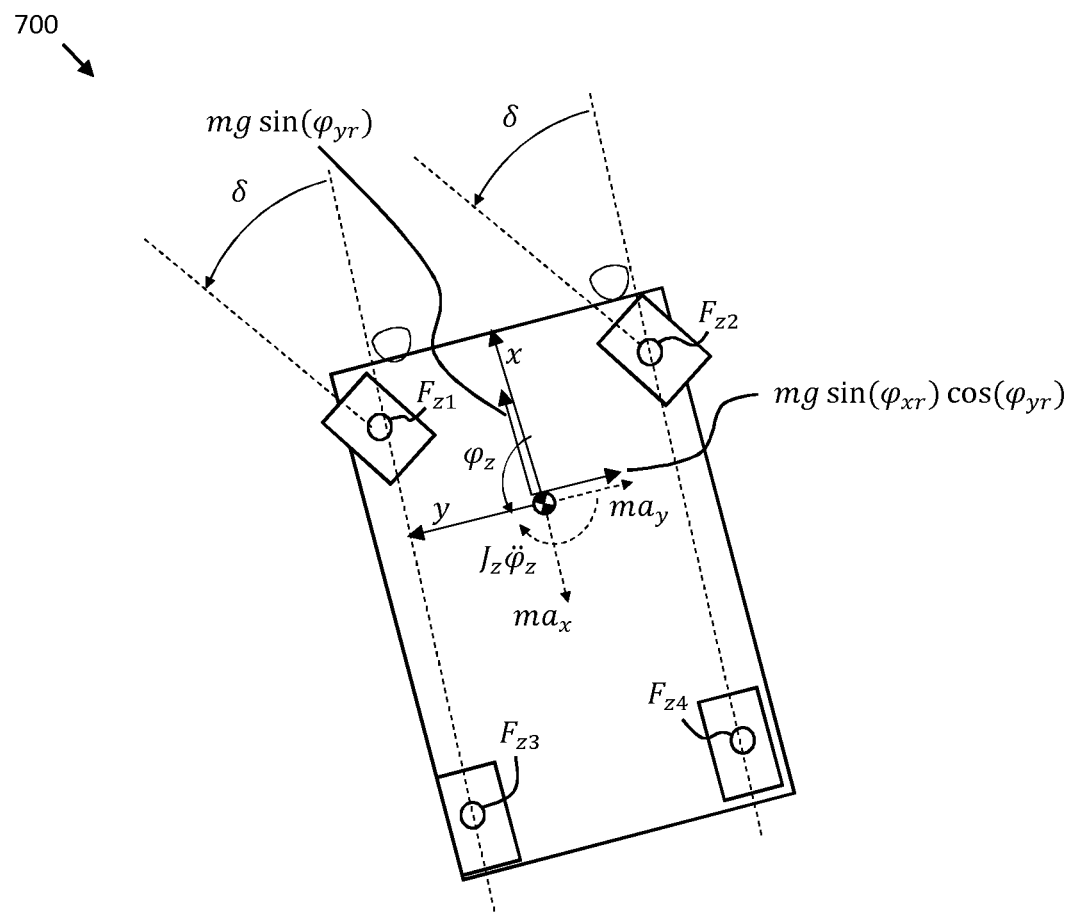

With reference to FIGS. 5-7, to calculate the normal forces $F_{z1}$, $F_{z2}$, $F_{z3}$, $F_{z4}$ for a unit with two axles, the following system of equations can be solved:

$m^*a_x=F_x$(longitudinal tyre force), $m^*a_y=F_{yr}+F_{yf}$(lateral axle force), $0=F_{z1}+F_{z2}+F_{z3}+F_{z4}-m^*g$(vertical force, assuming longitudinal acceleration $\dot{v}_z$ is negligibly small), $$J_x * \ddot{\varphi}_x = \frac{w}{2}(F_{z1} - F_{z2} + F_{z3} - F_{z4}) + h(F_{yr} + F_{yf})$$

(roll-torque around longitude axis), $0=l_r(F_{z3}+F_{z4})-l_f(F_{Z1}+F_{Z2})-h^*F_x$(pitch-torque around lateral axis, assuming a negligibly small pitch acceleration), $J_z^*\ddot{\varphi}_z=l_fF_{yf}-l_rF_{yr}+M_z$(yaw torque around vertical axis), $$\frac{w}{2}(F_{z1} - F_{z2}) - C_f * \varphi_x = H_{rc} * F_{yr}$$

(roll stiffness front, assuming $H_{rc}$ is the same for each axle), $$\frac{w}{2}(F_{z4} - F_{z3}) - C_r * \varphi_x = H_{rc} * F_{yr}$$

(roll stiffness rear, assuming $H_{rc}$ is the same for each axle), where $F_{z1}$, $F_{z2}$, $F_{z3}$, $F_{z4}$—front left, front right, rear left, and rear right normal forces, where
m—vehicle unit mass,
g—earth gravitational constant,
$a_x$, $a_y$—longitudinal and lateral accelerometer readings,
$F_x$—longitudinal tyre force,
$F_{yr}$, $F_{yf}$—rear and front axle lateral forces, respectively
$J_x$, $J_z$—roll and yaw inertia, $\varphi_x$, $\ddot{\varphi}_x$—vehicle unit roll angle and roll acceleration about x-axis,
$\varphi_y$, $\ddot{\varphi}_y$—vehicle unit roll angle and roll acceleration about y-axis,
$\varphi_z$, $\ddot{\varphi}_z$—vehicle unit roll angle and roll acceleration about z-axis,
$l_f$, $l_r$—front and rear axle longitudinal distances from CoG,
h—CoG height,
w—track width,
$M_z$—external way torque, e.g., from differential braking,
$C_f$, $C_r$—front and rear axle roll stiffness,
$H_{rc}$—vehicle unit roll center height (mean of the physical axles).

A solution can be represented as $$F_{z1} = \frac{l_r * m * g}{2 * L} - \frac{m * h * g}{2 * L}a_x -$$
$$\frac{m(h * C_f * L - H_{rc} * (C_f * l_f - C_r * l_r))}{w * L * (C_f + C_r)}a_y - \frac{H_{rc} * J_z}{w * L}\ddot{\varphi}_z + \frac{C_f * J_x}{w * (C_f + C_r)}\ddot{\varphi}_x$$

$$F_{z2} = \frac{l_r * m * g}{2 * L} - \frac{m * h}{2 * L}a_x +$$
$$\frac{m(h * C_f * L - H_{rc} * (C_f * l_f - C_r * l_r))}{w * L * (C_f + C_r)}a_y + \frac{H_{rc} * J_z}{w * L}\ddot{\varphi}_z - \frac{C_f * J_x}{w * (C_f + C_r)}\ddot{\varphi}_x$$

$$F_{z3} = \frac{l_f * m * g}{2 * L} + \frac{m * h}{2 * L}a_x -$$
$$\frac{m(h * C_r * L - H_{rc} * (C_f * l_f - C_r * l_r))}{w * L * (C_f + C_r)}a_y + \frac{H_{rc} * J_z}{w * L}\ddot{\varphi}_z + \frac{C_r * J_x}{w * (C_f + C_r)}\ddot{\varphi}_x$$

$$F_{z4} = \frac{l_f * m * g}{2 * L} + \frac{m * h}{2 * L}a_x -$$
$$\frac{m(h * C_r * L + H_{rc} * (C_f * l_f - C_r * l_r))}{w * L * (C_f + C_r)}a_y - \frac{H_{rc} * J_z}{w * L}\ddot{\varphi}_z - \frac{C_r * J_x}{w * (C_f + C_r)}\ddot{\varphi}_x$$

where $L=l_f+l_r$.

Note that we also get the roll angle can also be obtained as $$\varphi_x = \frac{m * (h - H_{rc}) * a_{ym} - J_x\ddot{\varphi}_x}{C_f + C_r}$$

Given the estimated tyre normal forces $F_{z1}$, $F_{z2}$, $F_{z3}$, $F_{z4}$ for the virtual axles, an allocation can be made between physical axles of the vehicle unit. The allocation is made under the assumption that the load between pusher axle and the rear axle is known (since those loads are measured). This quotient is denoted q in the following. For example, to allocate forces to four wheels on two axles, the normal force allocation is obtained from the solution of the system of equations $$F_{zc3} = F_{z3} + F_{z5}$$

$$F_{zc4} = F_{z4} + F_{z6}$$

$$\frac{w}{2}(F_{z4} - F_{z3}) - C_r * \varphi_x$$

(roll stiffness rear, in this case, axle is steered and lateral force is neglected)

$F_{z3}+F_{z4}=q^*(F_{z5}+F_{z6})$ where $F_{zc3}$ and $F_{zc4}$ are the lumped loads on left and right side, which gives the explicit solution:

$$F_{z21} = \frac{-(2*C_r*\varphi_x + 2*C_r*\varphi_x*q - F_{zc3}*q*w - F_{zc4}*q*w)}{2*w*(q+1)}$$

$$F_{z22} = \frac{(2*C_r*\varphi_x + 2*C_r*\varphi_x*q + F_{zc3}*q*w + F_{zc4}*q*w)}{2*w*(q+1)}$$

$$F_{z31} = \frac{(2*C_r*\varphi_x + 2*F_{zc3}*w + 2*C_r*\varphi_x*q + F_{zc3}*q*w - F_{zc4}*q*w)}{2*w*(q+1)}$$

$$F_{z32} = \frac{-(2*C_r*\varphi_x + 2*F_{zc4}*w + 2*C_r*\varphi_x*q + F_{zc3}*q*w - F_{zc4}*q*w)}{2*w*(q+1)}$$

The same principles discussed above for determining range for the suspension based estimator can be applied also for the IMU-based estimator, i.e., the second tyre normal force range $F_{z2,min}$, $F_{z2,max}$ can be determined based on a minimization and on a maximization, respectively, of an expression of tyre force $F_z$ based on the IMU data 320, subject to a set of pre-determined constraints on the IMU data 320.

$$F_{z1} = \frac{l_r*m*g}{2*L} - \frac{m*h*g}{2*L}a_x - \frac{m(h*C_f*L - H_{rc}*(C_f*l_f - C_r*l_r))}{w*L*(C_f + C_r)}a_y - \frac{H_{rc}*J_z}{w*L}\ddot{\varphi}_z + \frac{C_f*J_x}{w*(C_f + C_r)}\ddot{\varphi}_x$$

The following substitution can be made;

$$p_1 = \frac{l_r*m*g}{2*L}$$

$$p_2 = -\frac{m*h*g}{2*L}$$

$$p_3 = -\frac{m(h*C_f*L - H_{rc}*(C_f*l_f - C_r*l_r))}{w*L*(C_f + C_r)}$$

$$p_4 = -\frac{H_{rc}*J_z}{w*L}$$

$$p_5 = \frac{C_f*J_x}{w*(C_f + C_r)}$$

Instead of 12 parameters, the expressions now comprise 5 parameters $p_1$-$p_5$. Alternatively or as a complement, the second tyre normal force range $F_{z2,min}$ to $F_{z2,max}$ is determined based on a nominal value of tyre force $F_z$ obtained based on the IMU data 320, and on a pre-determined perturbation of the IMU data 320.

FIGS. 5-7 show details of a vehicle model that can be used to support normal force estimation according to the discussion above. FIG. 5 shows a side view 500 of a vehicle unit travelling downhill at an angle $\varphi_{yr}$. FIG. 6 shows a rear view of a vehicle at a banking angle $\varphi_{xr}$, with respect to some reference surface. It is appreciated that, although the relationship between parameters in FIGS. 5-7 is not explicitly defined herein, the skilled person is able to determine relationships between the different parameters in a straight forward manner.

The vehicle modelled in FIGS. 5-7 here has one rigid body and two axles. Each axle has two wheels. The body thus has four degrees of freedom: longitudinal and lateral motion in the road plane and roll and yaw angular motion. The rolling motion is exhibited around a roll axis defined by roll center heights at the front and rear axle. Note that the body pitch angular degree of freedom is intentionally ignored to not complicate the discussion. The suspension is conceptually modelled with a spiral spring at each axle with two axle parameters; roll stiffness and roll center height. Axles are modelled mass less and suspension damping is neglected.

Figure 10:
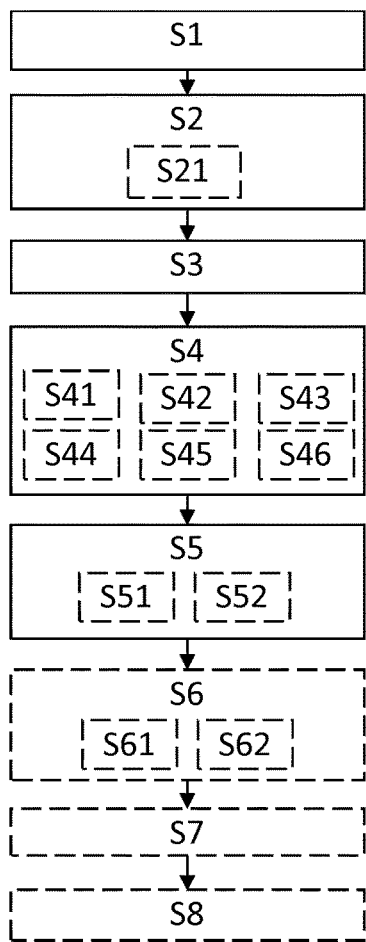
FIG. 10 is a flow chart illustrating methods.

The notation is as above, with the additions;
$a_x$ (m/s$^2$)—longitudinal acceleration
$a_y$ (m/s$^2$)—lateral acceleration
$F_a$ (N)—air drag force
$h_a$ (m)—air drag height
$J_x$ (kgm$^2$)—roll inertia
$J_z$ (kgm$^2$)—yaw inertia
$l_f$ (m)—length between CoG and front axle
$l_r$ (m)—length between CoG and rear axle
w (m)—vehicle track width
$\delta$ (rad)—front tyre-to-road steering angle
$\varphi_x$ (rad)—roll angle of body around roll centers
$\ddot{\varphi}_x$ (rad/s$^2$)—roll angular acceleration around roll centers
$\ddot{\varphi}_z$ (rad/s$^2$)—yaw angular acceleration around CoG
$\varphi_{xr}$ (rad)—road bank positive=right side down
$\varphi_{yr}$ (rad)—road gradient positive=downhill FIG. 10 is a flow chart illustrating methods which summarize the above discussions. There is shown a method for determining a tyre normal force range $F_{z,min}$ to $F_{z,max}$ of a tyre force $F_z$ acting on a vehicle 100. The method comprises obtaining S1 suspension data 310 associated with a suspension system of the vehicle 100, and also obtaining S2 inertial measurement unit (IMU) data 320 associated with the vehicle 100. These two types of data were discussed above.

According to some aspects, the suspension data 310 comprises an axle length $L_w$ or track width w, an axle mass $m_{axle}$, a suspension compression force value and left and right levelling sensor values.

For example, the suspension compression value may be a bellow pressure value related to a air suspension compression force $F_{z,bellow}$, an electromechanical suspension compression value or other compression force value associated with a suspension system of the vehicle 100.

As illustrated in FIG. 3, the method also comprises estimating S3, by a suspension-based estimator 330, a first tyre normal force range $F_{z1,min}$ to $F_{z1,max}$ based on the suspension data 310. For example, the first tyre normal force range $F_{z1,min}$ to $F_{z1,max}$ may be estimated S21 based on a relationship $$F_z = F_{z,suspension} + \frac{m_{axle}}{2g} + c_{roll}*\varphi,$$

where $F_z$ is tyre normal force, $F_{z,suspension}$ is a compression force associated with the suspension system, $m_{axle}$ is a mass of a wheel axle, $c_{roll}$ is a roll stiffness value associated with the wheel axle, and $\varphi$ is a roll angle associated with the wheel axle.

The first tyre normal force range $F_{z1,min}$, $F_{z1,max}$ may be determined based on a minimization and on a maximization, respectively, of an expression of tyre force $F_z$ based on the suspension data 310, subject to a set of pre-determined constraints on the suspension data 310.

The first tyre normal force range $F_{z1,min}$, $F_{z1,max}$ may also be determined based on a nominal value of tyre force $F_z$ obtained based on the suspension data 310, and on a pre-determined perturbation of the suspension data 310.

The method also comprises estimating S4, by an inertial force-based estimator 340, a second tyre normal force range $F_{z2,min}$ to $F_{z2,max}$ based on the IMU data 320.

According to some aspects, estimating the second tyre normal force range also comprises defining S41 at least one virtual vehicle axle 820, 930, 940 for each vehicle unit 801, 901, 902, estimating S42 tyre normal forces for each virtual axle, and allocating S43 the estimated tyre normal forces between the physical axles 810, 910, 920 of the vehicle unit 801, 901, 902.

According to some aspects, the at least one virtual axle 820, 930, 940 is defined S44 based on a center of gravity (CoG) of a corresponding vehicle unit 801, 901, 902.

According to some further aspects, a location of the at least one virtual axle 820, 930, 940 is selected S45 to be pitch torque equivalent with the vehicle unit 801, 901, 902, wherein an axle roll stiffness of the at least one virtual axle is determined by adding physical roll stiffness of corresponding physical axles, and wherein a roll center height of the at least one virtual axle is defined as an average roll center height of the corresponding physical axles.

According to aspects, allocating the estimated tyre normal forces between the physical axles of the vehicle comprises allocating S46 the estimated tyre normal forces based on a known load quotient between physical axles.

The second tyre normal force range $F_{z2,min}$ to $F_{z2,max}$ may for example be determined based on a minimization and on a maximization, respectively, of an expression of tyre force $F_z$ based on the IMU data 320, subject to a set of pre-determined constraints on the IMU data 320.

The second tyre normal force range $F_{z2,min}$ to $F_{z2,max}$ may also be determined based on a nominal value of tyre force $F_z$ obtained based on the IMU data 320, and on a pre-determined perturbation of the IMU data 320.

The disclosed method also determines S5 the tyre normal force range $F_{z,min}$ to $F_{z,max}$ based on the first tyre normal force range $F_{z1,min}$ to $F_{z1,max}$ and on the second tyre normal force range $F_{z2,min}$ to $F_{z2,max}$.

The disclosed methods may furthermore comprise determining S51 an upper limit $F_{z,max}$ of the tyre normal force range as the largest of the upper limits of the first tyre normal force range $F_{z1,max}$ and the second tyre normal force range $F_{z2,max}$.

The disclosed methods may also comprise determining S52 a lower limit $F_{z,min}$ of the tyre normal force range as the smallest of the lower limits of the first tyre normal force range $F_{z1,min}$ and the second tyre normal force range $F_{z2,min}$.

According to some aspects, the disclosed methods comprise determining S6 an uncertainty value $F_{z,uncertainty}$ associated with the determined tyre normal force range $F_{z,min}$, $F_{z,max}$, wherein the uncertainty value is based on a measure of road roughness.

The measure of road roughness may for example be obtained S61 based on any of; an IMU vertical acceleration value, an IMU pitch-rate value, and on a variation in level sensors of the vehicle suspension system.

According to some aspects, the uncertainty value $F_{z,uncertainty}$ is determined S62 based on a sum of squared measures of road roughness.

The disclosed methods may also comprise determining S7 a range of vehicle acceleration capabilities $a_{min}$ to $a_{max}$ based on the determined tyre normal force range.

The disclosed methods may furthermore comprise comprising distributing S8 wheel torque for vehicle operation between wheels of the vehicle 100, based on the determined tyre normal force range $F_{z,min}$, $F_{z,max}$ for each wheel.

Figure 11:
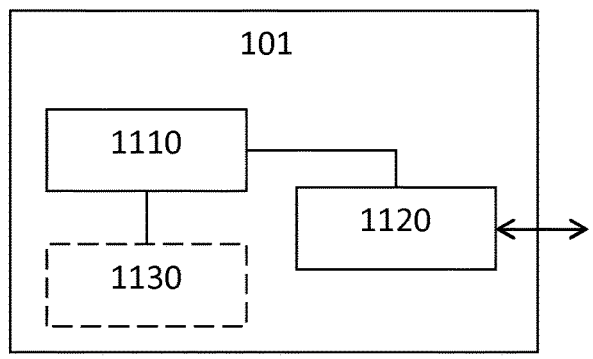
FIG. 11 schematically illustrates a control unit.

FIG. 11 schematically illustrates, in terms of a number of functional units, the components of a control unit 101 according to embodiments of the discussions herein. This control unit 101 may be comprised in the vehicle 100. Processing circuitry 1110 is provided using any combination of one or more of a suitable central processing unit CPU, multiprocessor, microcontroller, digital signal processor DSP, etc., capable of executing software instructions stored in a computer program product, e.g. in the form of a storage medium 1130. The processing circuitry 1110 may further be provided as at least one application specific integrated circuit ASIC, or field programmable gate array FPGA.

Particularly, the processing circuitry 1110 is configured to cause the control unit 101 to perform a set of operations, or steps, such as the methods discussed in connection to FIG. 10. For example, the storage medium 1130 may store the set of operations, and the processing circuitry 1110 may be configured to retrieve the set of operations from the storage medium 1130 to cause the control unit 101 to perform the set of operations. The set of operations may be provided as a set of executable instructions. Thus, the processing circuitry 1110 is thereby arranged to execute methods as herein disclosed.

The storage medium 1130 may also comprise persistent storage, which, for example, can be any single one or combination of magnetic memory, optical memory, solid state memory or even remotely mounted memory.

The control unit 101 may further comprise an interface 1120 for communications with at least one external device such as a suspension system sensor or IMU. As such the interface 1120 may comprise one or more transmitters and receivers, comprising analogue and digital components and a suitable number of ports for wireline or wireless communication. The processing circuitry 1110 controls the general operation of the control unit 101, e.g., by sending data and control signals to the interface 1120 and the storage medium 1130, by receiving data and reports from the interface 1120, and by retrieving data and instructions from the storage medium 1130. Other components, as well as the related functionality, of the control node are omitted in order not to obscure the concepts presented herein.

Figure 12:
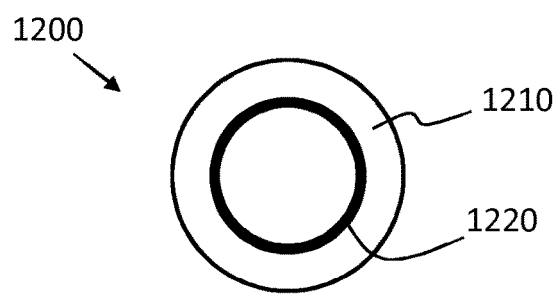
FIG. 12 shows an example computer program product.

FIG. 12 illustrates a computer readable medium 1210 carrying a computer program comprising program code means 1220 for performing the methods illustrated in FIG. 10, when said program product is run on a computer. The computer readable medium and the code means may together form a computer program product 1200.

The invention claimed is:

1. A method for determining a non-zero tire normal force range of a tire force acting on a vehicle, the method comprising;
   obtaining suspension data associated with a suspension system of the vehicle;
   obtaining inertial measurement unit, IMU, data associated with the vehicle;
   estimating, by a suspension-based estimator a first tire normal force range based on the suspension data;
   estimating, by an inertial force-based estimator, a second tire normal force range based on the IMU data;
   determining the non-zero tire normal force range based on the first tire normal force range and on the second tire normal force range; and
   distributing wheel torque for vehicle operation between wheels of the vehicle, based on the determined tire normal force range for each wheel.

2. The method according to claim 1, wherein the suspension data comprises an axle length or track width, an axle mass, a suspension compression force value and left and right levelling sensor values.

3. The method according to claim 2, wherein the suspension compression value is a bellow pressure value an electromechanical suspension compression value or other compression force value associated with a suspension system of the vehicle.

4. The method according to claim 2, wherein the first tire normal force range is estimated based on a relationship $$F_z = F_{z,suspension} + \frac{m_{axle}}{2g} + c_{roll} * \varphi,$$

where $F_z$ is tire normal force, $F_{z,suspension}$ is a compression force associated with the suspension system, $m_{axle}$ is a mass of a wheel axle, $c_{roll}$ is a roll stiffness value associated with the wheel axle, and $\varphi$ is a roll angle associated with the wheel axle.

5. The method according to claim 1, wherein the first tire normal force range is determined based on a nominal value of tire force obtained based on the suspension data, and on a pre-determined perturbation of the suspension data.

6. The method according to claim 1, wherein estimating the second tire normal force range comprises; defining at least one virtual vehicle axle for each vehicle unit; estimating tire normal forces for each virtual axle; and allocating the estimated tire normal forces between the physical axles of the vehicle unit.

7. The method according to claim 6, wherein the at least one virtual axle is defined based on a center of gravity of a corresponding vehicle unit.

8. The method according to claim 7, wherein a location of the at least one virtual axle is selected to be pitch torque equivalent with the vehicle unit, wherein an axle roll stiffness of the at least one virtual axle is determined by adding physical roll stiffness of corresponding physical axles, and wherein a roll center height of the at least one virtual axle is defined as an average roll center height of the corresponding physical axles.

9. The method according to claim 6, wherein allocating the estimated tire normal forces between the physical axles of the vehicle comprises allocating the estimated tire normal forces based on a known load quotient between physical axles.

10. The method according to claim 6, wherein the second tire normal force range is determined based on a minimization and on a maximization, respectively, of an expression of tire force based on the IMU data, subject to a set of pre-determined constraints on the IMU data.

11. The method according to claim 6, wherein the second tire normal force range is determined based on a nominal value of tire force obtained based on the IMU data, and on a pre-determined perturbation of the IMU data.

12. The method according to claim 1, comprising determining an upper limit of the tire normal force range as the largest of the upper limits of the first tire normal force range and the second tire normal force range.

13. The method according to claim 1, comprising determining a lower limit of the tire normal force range as the smallest of the lower limits of the first tire normal force range and the second tire normal force range.

14. The method according to claim 1, comprising determining an uncertainty value associated with the determined tire normal force range, wherein the uncertainty value is based on a measure of road roughness.

15. The method according to claim 14, wherein the measure of road roughness is obtained based on any of; an IMU vertical acceleration value, an IMU pitch-rate value, and on a variation in level sensors of the vehicle suspension system.

16. The method according to claim 14, wherein the uncertainty value is determined based on a sum of squared measures of road roughness.

17. The method according to claim 1, comprising determining a range of vehicle acceleration capabilities based on the determined tire normal force range.

18. A non-transitory computer readable medium carrying a computer program comprising program code for performing the steps of claim 1 when said program product is run on a computer or on processing circuitry of a control unit.

19. A control unit arranged to determine a tire normal force range of a tire force acting on a vehicle, the control unit being configured to perform the steps of the method according to claim 1.

20. A vehicle comprising a control unit according to claim 19.

* * * * *